Figure 1:
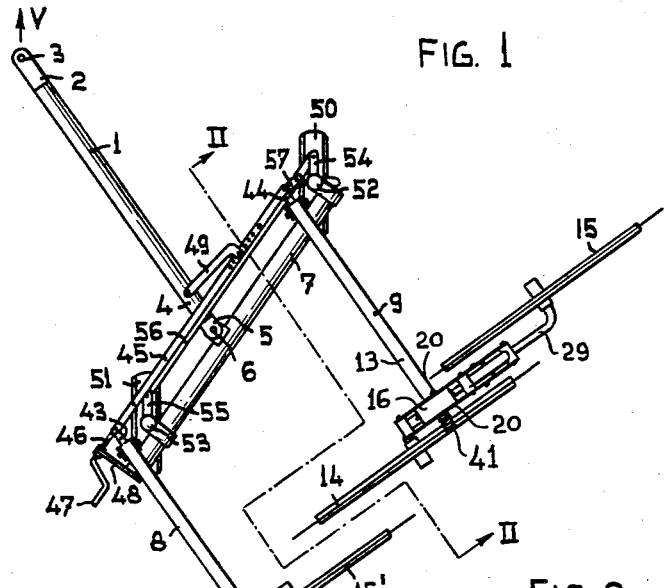

Dec. 13, 1960 C. VAN DER LELY ET AL 2,963,846
SIDE DELIVERY RAKING DEVICE
Filed May 20, 1957 3 Sheets-Sheet 1

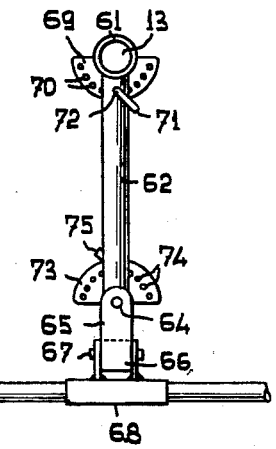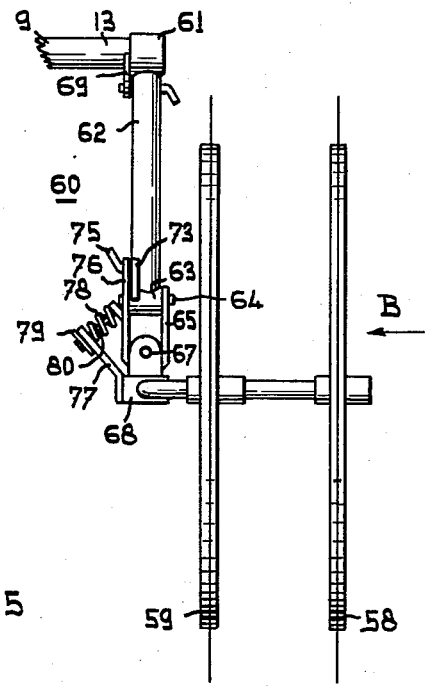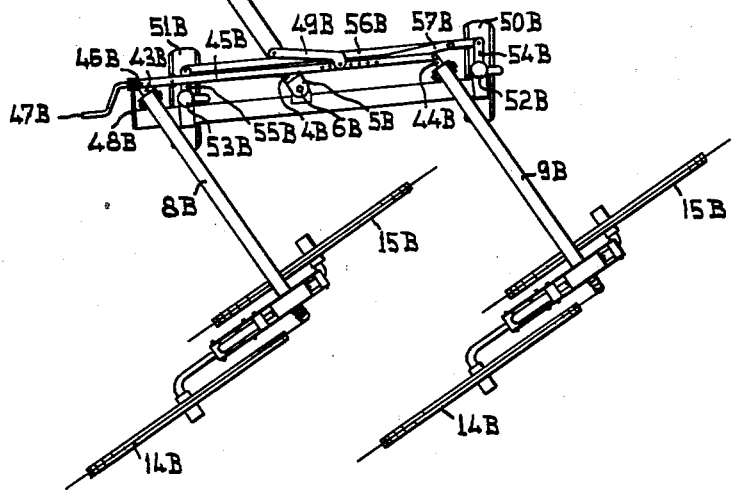

United States Patent Office 2,963,846
Patented Dec. 13, 1960

2,963,846

SIDE DELIVERY RAKING DEVICE

Cornelis van der Lely and Ary van der Lely, Maasland, Netherlands, assignors to C. van der Lely N.V., Maasland, Netherlands, a Dutch limited company Filed May 20, 1957, Ser. No. 660,239

Claims priority, application Netherlands May 19, 1956

20 Claims. (Cl. 56—377)

This invention relates to raking devices of the type comprising a frame on which at least two rake wheels or similar working members are mounted so as to be rotatable about shafts.

In known raking devices of this kind the rake wheels are carried by cranks usually lying in a horizontal plane and serving to adapt the rake wheels individually to the unevenness of the ground. In these known devices, a second working position may be obtained by removing the rake wheels and their cranks and by arranging them at different positions on the frame. Such an adjustment, however, requires much time.

The invention has as an object the provision of a raking device of the kind set forth which can be moved into a second working position in a simple manner.

According to the invention, there is provided a raking device wherein shafts are connected to a frame by supporting members so as to be rotatable about substantially horizontal pivot shafts, the arrangement being such that the device can be converted from one working position into another working position by turning the supporting members about their pivot shafts, the relative distance between the rake wheels in one working position exceeding that in the other working position.

Preferably, the rake wheels are arranged in one or more groups each of which comprises two rake wheels secured together to one supporting member. Thus, one group can be displaced as a whole by turning it about the associated horizontal pivot shaft.

It is a further disadvantage of the known devices that the rake wheels may be damaged when the device is driven in a direction differing from that in which it is driven when in a normal operating position. It has been found that, when the device is driven backwards, considerable forces are exerted on the rake wheels so that they may be damaged and are likely to be irreparably deformed. This applies particularly to the case in which the rake wheels are so connected to the frame as to be freely adjustable in height.

According to a further object of the invention there is provided a raking device wherein the shaft of each rake wheel is connected to the frame by a supporting member so as to be rotatable about a substantially horizontal pivot shaft, which lies at an angle to the intended direction of travel of the device, and wherein the shaft of each rake wheel is arranged so as to be rotatable in a first direction about its additional pivot shaft when the device is in a working position, there being provided a stop which prevents the movement of each rake wheel in a second direction opposite to the first direction beyond a certain limit.

It is thus insured that, when the device is driven backwards, the rake wheels rotate about the horizontal pivot shaft so that substantially no forces or only small forces are exerted on the rake wheels, and hence deformation of the rake wheels is substantially prevented. Preferably, a spring is provided for urging the supporting member against the stop. Thus the rake wheel will always tend to return into its working position.

Figure 2:
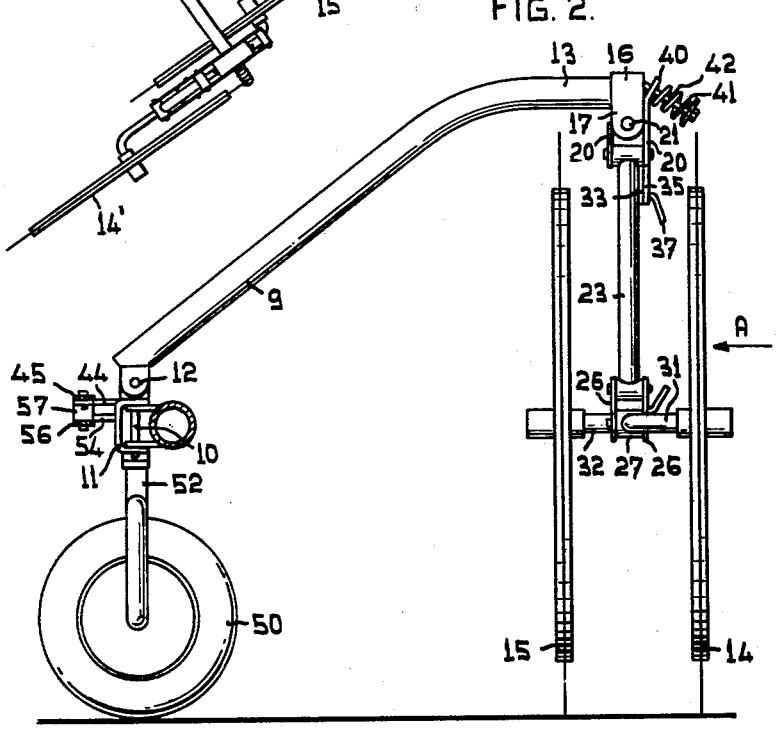
Figure 3:
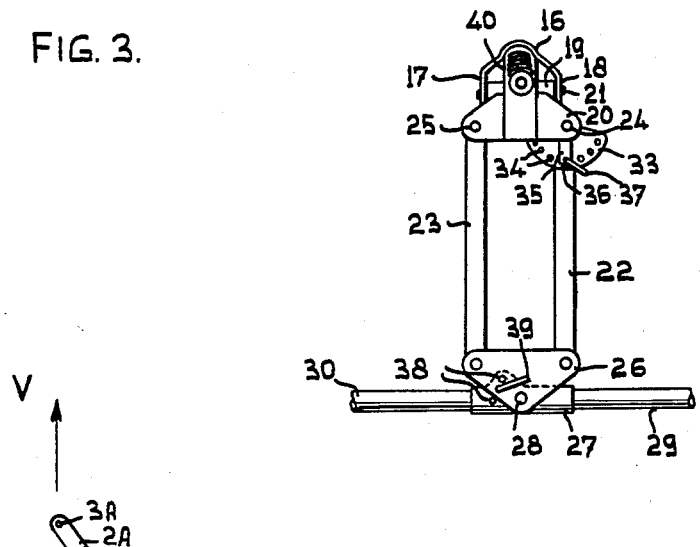
Figure 4:
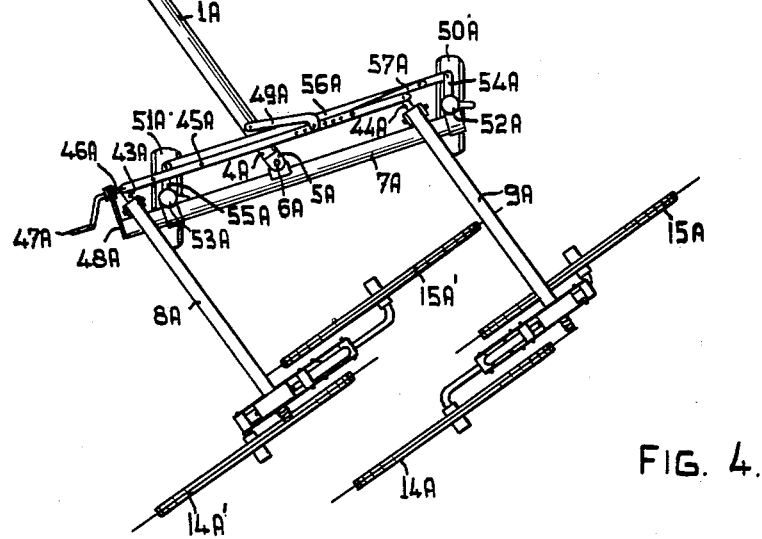

For a better understanding of the invention, and to show how the same may be carried into effect, reference will next be made to the accompanying drawings, in which:

Figure 1 is a plan view of a raking device in a position in which the device can be used as a side delivery rake, Figure 2 is an enlarged sectional view taken on line II—II of Figure 1, Figure 3 is an enlarged view taken in the direction of the arrow A in Figure 2, rake wheels of the device being, however, omitted, Figure 4 is a plan view of the raking device in a position in which the device can be used as a tedder, Figure 5 is a plan view of the raking device in a position in which the device can be used as a swath turner, Figure 6 is an enlarged view, similar to Figure 2, of a detail of a modification of the raking device, and Figure 7 is an enlarged view, similar to Figure 3, taken in the direction of the arrow B in Figure 6.

Referring now to Figures 1 to 3, there is shown a raking device in a position in which it can be used as a side delivery rake. The device comprises a draw-bar or draw arm 1, the front end 2 of which has an eye 3, so that the draw-bar 1 is adapted for connection to a tractor or like vehicle by means of which the device can be moved. The rear end 4 of the draw-bar 1 is provided with a fork 5 which by means of a pin 6 is pivotally connected to a mobile member or frame 7. Two spaced supporting or arched arms 8 and 9 are secured to the frame 7 and there is also secured to the frame 7 a vertical pivot 10 (see Figure 2), about which a strap 11 is adapted to pivot. The supporting arm 9 is pivotally connected to the strap 11 by means of a horizontal pin or pivot 12, and a group of two rake wheels 14 and 15 is secured to the end 13 of the supporting arm 9. A curved strip 16 is also secured to the end 13, the strip 16 being provided with ears or tags 17 and 18 (see also Figure 3), and a bearing 19 is pivotally connected to the tags 17 and 18 by a pin 21, two plates 20 being secured to the bearing 19.

Two downwardly depending supports or supporting members 22 and 23 are connected to the plates 20 so as to be pivotable about pivot pins 24 and 25, the lower ends of the supporting members 22 and 23 being secured to one another by two controls or control plates 26. The plates 20, the supporting members 22 and 23 and the plates 26 constitute a parallelogram of links. A connecting piece 27, disposed between the plates 26, is adapted to pivot about a shaft 28, the connecting piece 27 having two arms 29 and 30, on which the rake wheels 14 and 15 are mounted, the rake wheels being freely rotatable about shafts 31 and 32 of the arms 29 and 30. A semi-circular plate 33 is rigidly connected to the top end of the supporting member 22, the plate 33 being formed with holes 34 lying in an arc of a circle, in the center of which the pin 24 is disposed. A strip 35 is secured to one of the plates 20, the strip 35 being formed with a hole 36. By passing a locking pin or device 37 through the hole 36 and a registering one of the holes 34, pivotal movement of the supporting members 22 and 23 can be prevented. The connecting piece 27 is formed with holes 38, so that the connecting piece 27 can be prevented from rotating about the shaft 28 by passing a locking pin 39, secured to one of the plates 26, through one of the holes 38. A strip 40, which is urged against the end 13 of the arm 9 by a spring 41 is secured to one of the plates 20, the spring 41 enclosing a pin 42, which is secured to the end 13 of the supporting arm 9. Strip 40 and pin 42 constitute a limit or stop means.

The supporting arm 8 is secured to the frame 7 in the same manner as the supporting arm 9, and the arm 8 is also provided, in the same manner as the supporting arm 9, with two rake wheels 14 and 15.

The supporting arms 8 and 9 are provided at their front ends with a strip 43 or 44 respectively which are interconnected by a coupling rod 45, the coupling rod 45 being engaged by a threaded spindle 46 having a crank 47. The threaded spindle 46 is journalled in an arm 48, which is rigidly secured to the frame 7, and the drawbar 1 and the coupling rod 45 are coupled to one another by an arm 49.

The frame 7 is supported by two running or ground wheels 50 and 51, which are adapted to pivot about vertical axles 52 and 53, and the vertical axles 52 and 53 are provided with arms 54 and 55, which are interconnected by a coupling rod 56, the coupling rods 45 and 56 being coupled to one another by an intermediate rod 57.

Referring now to Figures 4 and 5, in which the device shown in Figures 1 to 3, is shown in different working positions, the same reference numerals are used as in Figures 1 to 3, but those of Figure 4 are differentiated by the suffix A, while those of Figure 5 are differentiated by the suffix B. Figure 4 shows the device of Figure 1 in a working position in which the two groups of rake wheels lie near one another. The rearmost rake wheels 14A and 14A' of each group operate at a distance above the ground, whereas the foremost rake wheels 15A and 15A' of each group are in contact with the ground. This position is obtained by turning the connecting piece 27 about the shaft 28 and by introducing the locking pin 39 into a different hole 38. In this position the device is used for turning crops dispersed arbitrarily on a field, i.e. crops not lying in swaths, so that the device can be used as a tedder. Figure 5 shows the device in a working position in which two separate swaths are worked and the two groups of rake wheels are spaced further apart than in the position shown in Figure 4.

The device shown in Figure 1 is a side delivery rake, the crop being delivered to the left-hand side, when the device is moved in the direction of the arrow V. In order to move the device from the working position shown in Figure 1 into the working position shown in Figures 4 and 5, the supporting arms 8 and 9 have to be turned about the pivot shafts 10 so as to move relative to member 7, and the two groups of rake wheels must be moved further apart from one another by turning the supporting members 22 and 23 about the pivot pins 24 and 25 (Fig. 3), whereby the distance between the groups of rake wheels is increased and the rake wheel 14 of the supporting arm 9 may be moved behind the rake wheel 15' of the supporting arm 8. Thereafter the members 22 and 23 may be turned about the pivot pins 24 and 25 so that the groups of rake wheels assume the positions shown in Figures 4 or 5.

The crank 47 is rotated to displace the coupling rod 45 so that the supporting arms 8 and 9 turn about the vertical pivot shafts or pivots 10. Since the draw-bar 1 is connected to the coupling rod 45 by the arm 49, the draw-bar will at the same time turn about the pin 6 relative to the frame member 7. Owing to the connection of the coupling rod 45 with the coupling rod 56 the position of the ground wheels 50 and 51 will at the same time be changed. With this construction it is insured that, upon turing the groups of rake wheels about the pivot shafts 10, the draw-bar 1 and the ground wheels 50 and 51 are at the same time moved into their correct positions. The relative positions of the draw-bar 1, the ground wheels 50 and 51 and the rake wheels 14 and 15 may be varied by altering the position of the connection between the coupling rod 45 and the arm 49 and/or the intermediate rod 57. When the locking pin 37 is removed, the supporting members 22 and 23 can be turned about the pivot pins 24 and 25, after which the locking pin 37 can be introduced into a different hole 34, so that the distance between the shafts of the rake wheels of the two groups, connected to the supporting arms 8 and 9, is varied, and so that a different working position is obtained.

Referring now to Figures 6 and 7, there is shown a modification of the raking device shown in Figures 1 to 5. In this modification, two rake wheels 58 and 59 are secured to a supporting arm 9, by means of a supporting member 60. The supporting member 60 includes a bearing 61, which is rotatable about the end 13 of the supporting arm 9, an arm 62, the lower end of which is provided with a bearing 63 being secured to the bearing 61. A fork 65 is coupled to the bearing 63 by means of a pin 64, the fork 65 having a bearing 66 to which a connecting piece 68 is connected by means of a pin 67.

The connecting piece 68 supports the rake wheels 58 and 59, the ends of this piece being directed backwards relative to the intended direction of travel of the device. A semi-circular disc 69 is secured to the end 13 of the supporting arm 9, the disc 69 being formed with holes 70, through any one of which can be passed a locking pin 71, which can also be passed through a hole 72 in the arm 62, so that the supporting member 60 can be locked relative to the disc 69. A semi-circular disc 73 is secured to the arm 62 and is formed with holes 74. A tag 76 is rigidly secured to the fork 65 so that by passing a locking pin 75 through a hole in the tag 76 and a registering hole 74 in the disc 73, the fork 65 can be locked relative to the disc 73 and the arm 62. A curved arm 77, which is urged by a spring 78 against a stop 79 is secured to the connecting piece 68, the spring 78 enclosing a pin 80, which is rigidly secured to the fork 65, the pin 80 passing through the stop 79.

When the locking pin 71 is removed, the arm 62 can be turned relative to the supporting arm 9, and the locking pin 71 can be re-positioned in another of the holes 70. By turning the arm 62 relative to the supporting arm 9 the connecting piece 68 will be moved out of its horizontal position, but by removing the locking pin 75 and turning the fork 65 about the pin 64, the connecting piece 68 can again be moved into its horizontal position, whereby the height of the rake wheels above the ground can be altered, after which the locking pin 75 can be re-positioned in another of the holes 74. If necessary, in order to obtain the working position shown in Figure 4, the connecting piece 68 can be moved out of its horizontal position by turning it about the pin 64, the connecting piece 68 being fixed in the desired slanting position by means of the locking pin 75.

When the device shown in Figures 1 to 5 or 6 and 7 is moved forward in the direction of the arrow V, the rake wheels 14 and 15 or 58 and 59 tend to turn about the pins 21 and 67 respectively, so that the strip 40 and the arm 77 respectively will bear on the end 13 and the stop 79 respectively.

During operation of the device, however, it may be necessary to drive the device backwards, which will load the rake wheels in an unfavourable manner and will expose the rake wheels to the risk of deformation. In order to avoid this deformation, the rake wheels 14 and 15 or 58 and 59 are adapted to rotate about the pins 21 and 67 respectively, during such backward movement, and the strip 40 and the arm 77 respectively do not prevent this rotation during the backward movement. The tension in the springs 41 and 78 which tend to urge the strip 40 and the arm 77 respectively against the stop must, however, be overcome.

Owing to the rotation about the pins 21 and 67, the rake wheels will be canted out of their vertical position and will lie at an angle to the ground of less than 90°. Owing to the slanting position of the rake wheels, they are capable of moving readily over uneven ground and they will not be subjected to harmful forces tending to deform them.

This construction is particularly important for devices in which the rake wheels are positioned behind the ground wheels and are rotatable about horizontal axes such as, for example, the axis of the pin 12, which axes lie comparatively far in front of the rake wheels and are at an angle to the axes of the rake wheels. During the forward movement, the rake wheels, when encountering bumps in the ground, will turn about these horizontal axes and move upwards. During the backward movement, however, they tend to dig into the ground and may be damaged or even deformed. Owing to the slanting position which the rake wheels are now capable of occupying, this is, however, avoided. Subsequent to the backward movement and the re-adjustment to the movement in the direction of the arrow V, the rake wheels will turn back about the pin 21 or 67 into their working positions, which movement is assisted by the springs 41 and 78, respectively, which springs always tend to move the rake wheels back into their working positions.

What we claim is:

1. A raking device comprising a mobile member, parallel free-wheeling rake wheels, shafts supporting said rake wheels for rotation, and support means defining horizontal axes of rotation associated with and spaced from said shafts, said support means coupling said shafts to said mobile member with said shafts respectively pivotable about said axes whereby the spacing of said wheels is adjustable.

2. A device as claimed in claim 1 wherein said support means comprises pivots above said shafts and means connecting said shafts to said pivots for pivoting thereabout.

3. A device as claimed in claim 1 comprising means coupling the shafts of the wheels in pairs so that the wheels are pivotable in pairs.

4. A device as claimed in claim 1 comprising locking devices operatively associated with said support means for locking said shafts in determinable positions.

5. A raking device comprising a mobile frame, support arms pivotally mounted on said frame in spaced relation and adapted for pivoting about horizontal axes, means operatively associated with said arms for controlling the positions thereof relative to said frame, rake wheels, and supports pivotally depending from said arms and supporting said rake wheels for operation, the pivoting of the supports about said horizontal axes determining the spacing of the rake wheels.

6. A device as claimed in claim 5 wherein said means is rigidly coupled between said arms and maintains the arms in parallel relationship.

7. A device as claimed in claim 5 wherein said supports include means for connecting the rake wheels in pairs and means for maintaining the pairs in fixed attitude relative to said arms.

8. A device as claimed in claim 5 comprising means coupling said rake wheels to said supports and determining the relative positions therebetween.

9. A support for adjustably supporting a rake wheel in depending relationship on a horizontal axle comprising a supporting member, means pivotally coupling said member to said axle, first locking means operatively associated with said member and fixing the position of said member relative to said axle, an arm coupling said wheel to said member and second locking means operatively associated with and fixing the relative positions of said arm and member whereby the relationship of said wheel and axle is determined.

10. A raking device comprising a mobile frame, a rake wheel defining a plane of rotation, a support coupling said rake wheel to the frame and including pivot means enabling said wheel to pivot in opposite directions both of which are substantially perpendicular to said plane, and stop means operatively associated with said support and wheel to limit the magnitude of pivot in one of said directions to prevent deformation of said wheel.

11. A device as claimed in claim 10 comprising a shaft connected to said support and supporting said wheel for rotation, said pivot means and shaft being substantially coplanar for reducing the deformation of said wheel.

12. A device as claimed in claim 10 wherein said stop means includes a resilient device urging said wheel in one of said directions.

13. A device as claimed in claim 10 wherein the pivot means is coupled to said frame and spaced from said wheel whereby the distance between the frame and wheel is altered by a pivoting of said wheel.

14. A device as claimed in claim 10 wherein said support normally supports said wheel in a vertical plane; said wheel, upon pivoting, deviating from the vertical plane.

15. A device as claimed in claim 10 comprising running wheels supporting said frame for movement in a normal predetermined direction, the rake wheel being positioned behind the running wheels.

16. A raking device comprising a frame, running wheels supporting said frame, arched arms extending away from said frame, pivots coupling said arms to said frame for both horizontal and pivotal motions with respect thereto, means coupling said arms in parallel relationship and controlling the horizontal pivotal movement of the arms with respect to the frame, downwardly depending supports pivotally connected to said arms, locking devices operatively associated with said arms for fixing the positions of said supports on said arms, and rake wheels mounted on said supports whereby the relative positions of the wheels with respect to each other and to the frame are adjustable.

17. A device as claimed in claim 16 wherein pairs of said rake wheels are coupled to each support, said support comprising a parallelogram of links to maintain the pairs in fixed relation to said arms.

18. A device as claimed in claim 17 comprising a draw arm adjustably connected to said frame.

19. A device as claimed in claim 17 comprising a locking device operatively associated with and fixing the relationship of each support on the associated arm.

20. A device as claimed in claim 19 comprising a further locking device operatively associated with and fixing the relationship of each pair of wheels on the associated support.

References Cited in the file of this patent

UNITED STATES PATENTS

| 2,459,961 | Pollard | Jan. 25, 1949 |
| 2,603,053 | Lipe et al. | July 15, 1952 |
| 2,727,351 | Plant | Dec. 20, 1955 |
| 2,796,723 | Smith et al. | June 25, 1957 |

FOREIGN PATENTS

| 1,108,778 | France | Sept. 14, 1955 |